United States Patent [19]

Strand et al.

[11] Patent Number: 5,041,219

[45] Date of Patent: Aug. 20, 1991

[54] DUAL CHAMBER WATER FILTER

[76] Inventors: Charles D. Strand, 849 Saddlebrook, Bedford, Tex. 76021; Anthony Meehon, 5711 Honey Locust, Arlington, Tex. 76106

[21] Appl. No.: 478,676

[22] Filed: Feb. 12, 1990

[51] Int. Cl.⁵ .............................................. B01D 24/18
[52] U.S. Cl. ..................................... 210/284; 210/286
[58] Field of Search ............... 210/266, 284, 286, 287

[56] References Cited

U.S. PATENT DOCUMENTS

| D. 296,463 | 6/1988 | Padilla | D23/209 |
|---|---|---|---|
| 93,339 | 8/1869 | Parrot | 210/286 |
| 342,151 | 5/1886 | Walls | 210/284 |
| 2,101,961 | 12/1937 | Slidell | 210/24 |
| 2,525,497 | 10/1950 | Monfried | 206/46 |
| 4,561,974 | 12/1985 | Bernard et al. | 210/151 |
| 4,561,976 | 12/1985 | Houser | 210/290 |
| 4,561,979 | 12/1985 | Harms et al. | 210/438 |
| 4,642,192 | 11/1988 | Heskett | 210/638 |
| 4,714,546 | 12/1987 | Solomon et al. | 210/137 |
| 4,747,945 | 5/1988 | Kreusch et al. | 210/290 |

Primary Examiner—Ivars Cintins
Attorney, Agent, or Firm—W. Kirk McCord

[57] ABSTRACT

A liquid filter has a housing with a bottom and a top. A vertical partition divides the housing into an inlet chamber on one side and an outlet chamber on the other side. One type of filtration material is located in the inlet chamber. Another type is located in the outlet chamber. The inlet to the inlet chamber is located in the bottom of the housing and results in an upward flow through the inlet chamber. The outlet chamber has an outlet located in the bottom. A port locates at the top of the partition. This results in a downward flow through the outlet chamber.

6 Claims, 2 Drawing Sheets

DUAL CHAMBER WATER FILTER

BACKGROUND OF THE INVENTION

1. Field of the Invention:

This invention relates in general to water filters, and in particular to a filter that has chambers containing separate filtration materials.

2. Description of the Prior Art:

Many households use water filters to remove impurities from water. Typically these filters connect to a kitchen sink faucet. One type of filtration material comprises activated granulated charcoal. Charcoal removes organic materials and various solids. Another type of filtration material employed is a metallic particulate. The metal particles remove inorganic materials through an ion exchange.

Previously, when a filtration system utilized both of these materials, they have been enclosed in either separate containers or in the same container. When they are in the same container, the two separate filtration materials are placed in a single chamber in contact with each other. Coming into direct contact with each other may have a detrimental effect on the operating efficiency and life expectancy.

Also, the flow of the liquid proceeds in the same direction through each filtration material when they are both in the same chamber. The disadvantage to this is that the charcoal material works best in a condition where the flow is downward. This compacts the material. The metallic particulate works best in an upflow condition with the flow reducing compaction.

When these materials are enclosed in separate containers, the flow direction and compaction can be controlled for each one. This provides for an optimum design, but it increases the cost and size in a point-of-use, household filtration unit.

SUMMARY OF THE INVENTION

The filter of this invention has a housing with a bottom and a top. A vertical partition divides the housing into an inlet chamber on one side of the housing and an outlet chamber on the other. A first filtration particulate is located in the inlet chamber. Preferably, this is a metallic particle material for filtering inorganic material impurities from the water. The metallic particles only partially fill the first chamber, so that the water flow can cause an upward flow of the particles as the water flows through.

The partition has a port, preferably slots, located near the top. The liquid passes from the inlet chamber into the outlet chamber through the slots. The outlet chamber is filled with an activated granular charcoal. The charcoal filters inorganic impurities from the water. The downward flow through the charcoal further compacts the charcoal.

DETAILED DESCRIPTION OF THE INVENTION

Figure 1:
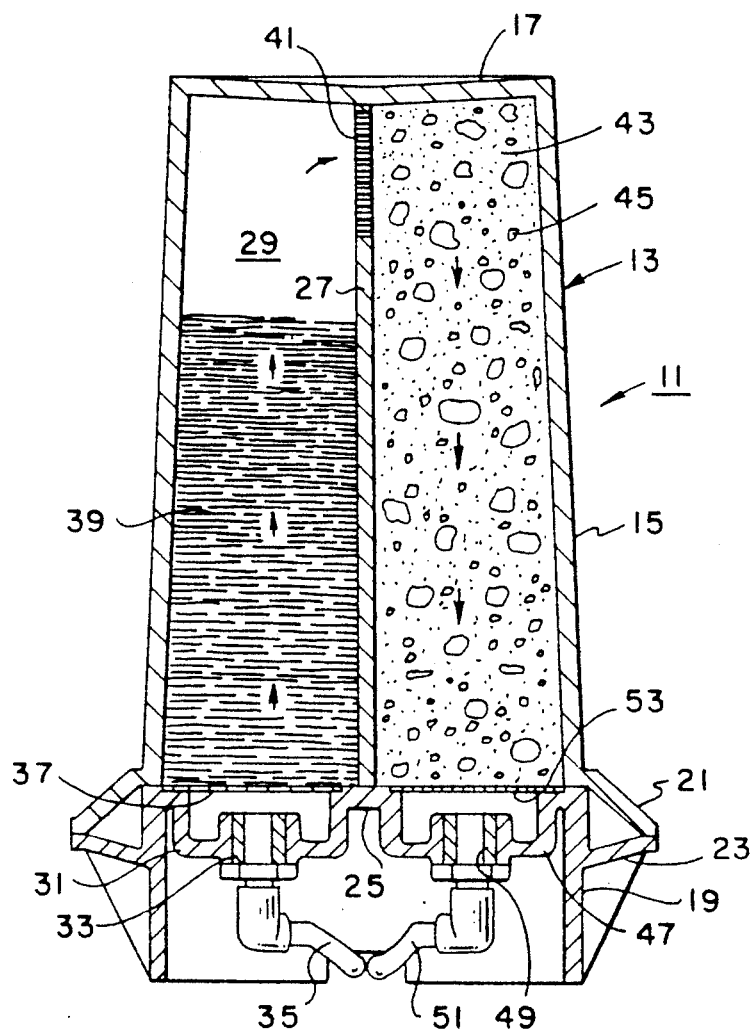
FIG. 1 is a vertical sectional view of a filter constructed in accordance with this invention.

Referring to FIG. 1, filter 11 has a housing 13. The housing 13 is a truncated cone. The side walls 15 are conical, tapering from a larger diameter at the bottom to a smaller diameter at the upper end. The housing has a top 17 that encloses the upper end of the side walls 15. A base 19 locates at the lower end of the housing 13. A flange 21 extends downward and outward from the lower end of the side walls 15. A flange 23 extends upward and outward from the base 19. The flanges 21, 23 are sonically welded together to secure the base 19 to the housing 13. The base 19 thus becomes a part of the housing 13.

Figure 2:
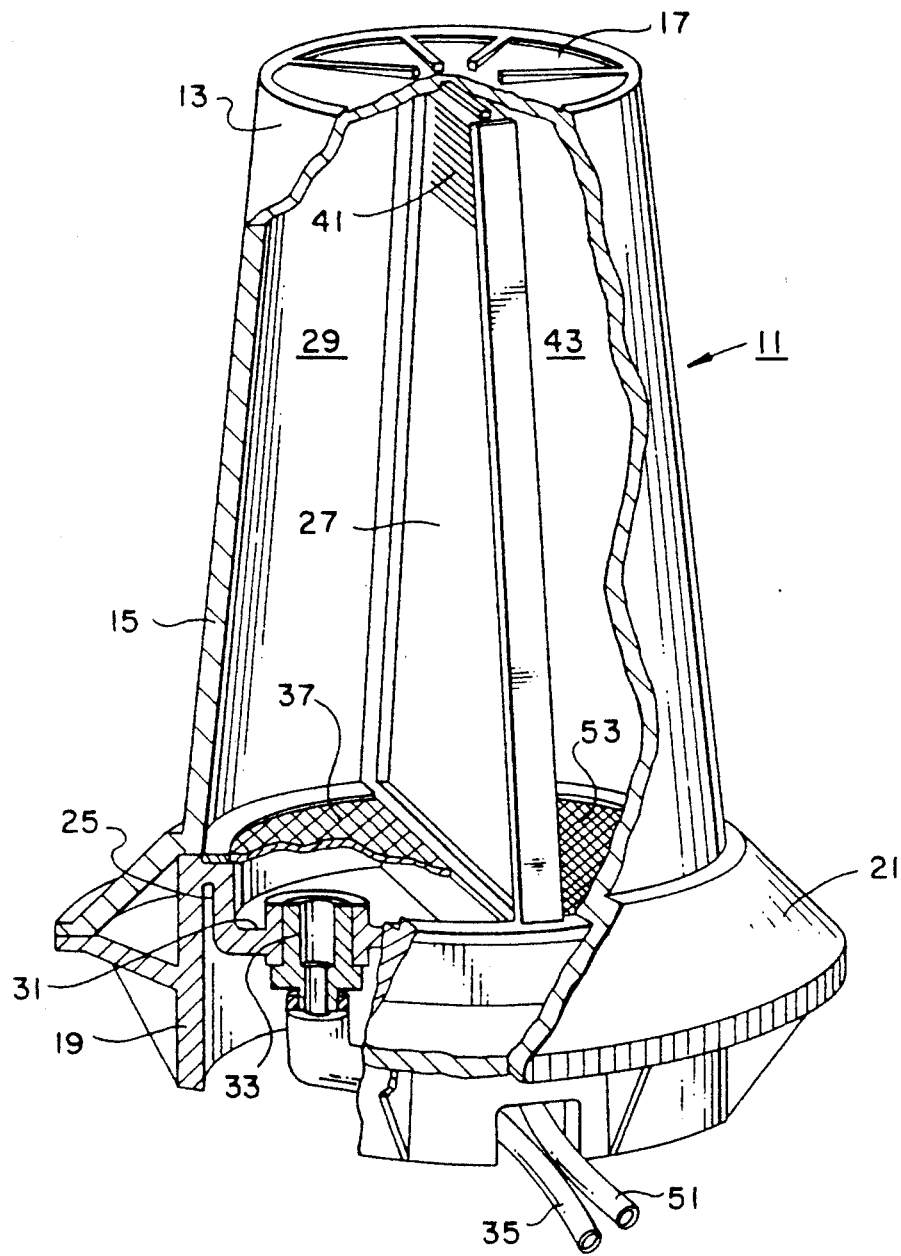
FIG. 2 is a perspective view of the filter of FIG. 1, with portions broken away to show the interior.

Base 19 has a top 25 which becomes the bottom of the housing 13. A partition 27 extends vertically upward from the base top 25 to the housing top 17. Partition 27 is a flat wall. An inlet chamber 29 will be located on one side of the partition 27. The inlet chamber 29 comprises the entire space of the housing 13 on the left side of the partition 27, as shown in FIGS. 1 and 2.

A depression 31 locates in the base top 25 within the inlet chamber 29. An inlet 33 extends through the depression 31. Inlet 33 connects to a line 35 which leads to a faucet (not shown) for supplying water. A screen 37 of preferably 100 mesh locates over the depression 31 for filtering liquid flowing in through the line 35.

The inlet chamber 29 is filled with a metallic particulate 39. The metallic particulate 39 comprises metal particles which create an ion exchange with inorganic material. Metallic particulate 39 removes traces of heavy metals from the water. One type of metallic particulate 39 that is suitable is described in U.S. Pat. No. 4,642,192. Metallic particulate 39 fills about three-fourths of the inlet chamber 29. The remaining space is open.

Port means comprising a plurality of horizontal slots 41 extend through the partition 27 near the top 17. The slots 41 preferably will be located above the upper level of the metallic particulate 39. The slots 41 are small enough to block any of the metallic particles 39 from flowing out of the inlet chamber 29.

An outlet chamber 43 comprises the space in the housing 13 on the right side of the partition 27. Outlet chamber 43 is of the same dimension as the inlet chamber 29. It is filled with an activated granular charcoal material 45. It will be filled completely to the top preferably.

A depression 47 is formed in the base top 25. An outlet 49 connects to a line 51. Line 51 will lead back to the water faucet for distribution of the filtered water. A screen 53 of a finer mesh than the screen 37 locates on top of the depression 47. Screen 53 is preferably of 200 mesh, and thus has holes that are smaller than screen 37.

In operation, when the user opens a valve (not shown) at the faucet, water will flow through the line 35 into the inlet chamber 29. The water will flow upward through the metallic particulate 39. The metallic particulate 39 will remove inorganic impurities from the water. The upward flow of the water causes the particles 39, which are irregularly shaped, to move around and flow upward to some extent. This upward movement increases the surface area of the particles 39 over which the water flows. This upward flow reduces compaction which might occur if the water were flowing downward. Some of the particles will suspend in the upward flowing liquid, preventing cementation of the particles 39.

The water will flow through the slots 41 into the outlet chamber 43. The water will flow downward through the granulated charcoal 45. The downward flow increases the compaction of the charcoal 45. This assures minimum space between the particles, which increases the filtering capability of the charcoal 45. The cross sectional area of the outlet chamber 43 increases from the top 17 to the base 19 because of the conical contour of the housing side walls 15. This increase in flow area slows the water flow rate as it reaches the outlet screen 53. The water will flow through the outlet 49 and line 51 to a tap for filling a container.

The invention has significant advantages. The two separate chambers prevent mixing of one filtration material with another. The vertical partition enables one filter material to have an upward flow and the other to have a downward flow. The filtration material which operates best with an upward flow can be located in the inlet chamber, while the outlet chamber can hold the filtration material that operates best with the downward flow.

While the invention has been shown in only one of its forms, it should be apparent to those skilled in the art that it is not so limited, but is susceptible to various changes without departing from the scope of the invention.

We claim:

1. A liquid filter, comprising in combination:
   a housing having a bottom and a top;
   a vertical partition located in the housing, dividing the housing into an inlet chamber on one side of the housing and an outlet chamber on the other side of the housing;
   a first filtration particulate located in the inlet chamber, the first filtration particulate being a metallic particulate for removing inorganic particles in the liquid by ion exchange;
   a second filtration particulate located in the outlet chamber, the second filtration particulate being granular activated charcoal;
   an inlet means located in the bottom of the housing in the inlet chamber for receiving liquid to be filtered and for causing it to flow upward through the first filtration particulate so as to reduce compaction of the first filtration particulate;
   a port means in the partition adjacent the top of the housing, for causing liquid flowing upward through the inlet chamber to flow from the inlet chamber into the outlet chamber; and
   an outlet means located in the bottom of the housing in the outlet chamber, for causing liquid flowing into the outlet chamber from the inlet chamber to flow downward through the second filtration particulate in the outlet chamber so as to increase compaction and out of the housing.

2. The filter according to claim 1 further comprising an inlet screen located over the inlet means and an outlet screen located over the outlet means, the outlet screen having a finer mesh size than the inlet screen.

3. The filter according to claim 1 wherein the port means has means for preventing any of the first particulate from moving into the outlet chamber.

4. The filter according to claim 1 wherein the outlet chamber has an increasing cross-sectional area in a downward direction.

5. A liquid filter, comprising in combination:
   a housing having a base on one end;
   a partition located in the housing, dividing the housing into an inlet chamber on one side of the housing and an outlet chamber on the other side of the housing;
   a metallic filtration particulate located only in the inlet chamber;
   a charcoal filtration particulate located only in the outlet chamber;
   an inlet means located in the base of the housing in the inlet chamber for receiving liquid to be filtered and for causing it to flow upward through the metallic filtration particulate so as to reduce compaction;
   a port means in the partition at an end of the partition opposite the base of the housing, for causing liquid flowing through the inlet chamber to flow from the inlet chamber into the outlet chamber, but for preventing any of the metallic filtration particulate from flowing into the outlet chamber;
   an outlet means located in the base of the housing in the outlet chamber, for causing liquid flowing into the outlet chamber from the inlet chamber to flow downward through the charcoal filtration particulate so as to reduce compaction and out of the housing and
   the outlet chamber having an increasing cross sectional area in a downward direction for slowing the liquid flow rate as the liquid nears the outlet means.

6. A liquid filter, comprising in combination:
   a conical housing having a bottom and a top, the top being of smaller diameter than the bottom;
   a vertical partition located in the housing, dividing the housing into an inlet chamber on one side of the housing and an outlet chamber on the other side of the housing;
   a metallic filtration particulate located in the inlet chamber;
   a charcoal filtration particulate located in the outlet chamber;
   an inlet located in the bottom of the housing in the inlet chamber for receiving liquid to be filtered and for causing it to flow upward through the metallic filtration particulate so as to reduce compaction of the metallic filtration particulate;
   a port in the partition adjacent the top of the housing, for causing liquid flowing upward through the inlet chamber to flow from the inlet chamber into the outlet chamber;
   the port means having means for preventing any of the metallic filtration particulate from moving into the outlet chamber;
   an outlet located in the bottom of the housing in the outlet chamber, for causing liquid flowing into the outlet chamber form the inlet chamber to flow downward through the charcoal filtration particulate in the outlet chamber so as to increase compaction and out of the housing; and
   an inlet screen located over the inlet and an outlet screen located over the outlet; the outlet screen having a finer mesh than the inlet screen.

* * * * *